United States Patent [19]
van Duyn

[11] Patent Number: 5,757,094
[45] Date of Patent: May 26, 1998

[54] VENTILATION SYSTEM FOR AN AC MACHINE HAVING OVERHANGING SALIENT POLES WITH JUXTAPOSED SHROUDS

[75] Inventor: Martin van Duyn, Peterborough, Ontario, Canada

[73] Assignee: General Electric Canada Inc., Mississauga, Canada

[21] Appl. No.: 787,047

[22] Filed: Mar. 28, 1997

[51] Int. Cl.[6] ............................................. H02K 9/00
[52] U.S. Cl. .......................... 310/58; 310/52; 310/59; 310/60 S; 310/61; 310/62; 310/157
[58] Field of Search ............................ 310/52, 58, 59, 310/60 S, 64, 61, 62, 157

[56] References Cited

U.S. PATENT DOCUMENTS

| | | | |
|---|---|---|---|
| 4,031,422 | 6/1977 | Armor et al. | 310/256 |
| 4,182,966 | 1/1980 | Mishra et al. | 310/59 |
| 4,233,533 | 11/1980 | Lown | 310/59 |
| 4,270,064 | 5/1981 | Glandorf et al. | 310/90 |
| 4,499,660 | 2/1985 | Lenz | 29/598 |
| 5,134,329 | 7/1992 | Lang | 310/63 |
| 5,306,972 | 4/1994 | Hokanson et al. | 310/58 |
| 5,605,058 | 2/1997 | Ferguson et al. | 310/62 |

FOREIGN PATENT DOCUMENTS

| | | | |
|---|---|---|---|
| 3128772-A1 | 3/1982 | Germany | 310/58 |

*Primary Examiner*—Steven L. Stephan
*Assistant Examiner*—Elvin G. Enad
*Attorney, Agent, or Firm*—Edward H. Oldham

[57] ABSTRACT

A method of improving the airflow through a low to medium speed salient pole dynamoelectric machine DEM is disclosed. The rotor rim on which the salient poles are mounted is shortened in comparison to prior art structures so that the ends of the salient poles (and the rotor windings) protrude a substantial distance beyond the edge of the rim. A stationary or rotating shield is placed in juxtaposed relationship with the rotating ends of the salient poles to provide an enclosure so that the protruding ends of the salient poles can function as a crude radial fan.

13 Claims, 7 Drawing Sheets

FIG. 2. (PRIOR ART)
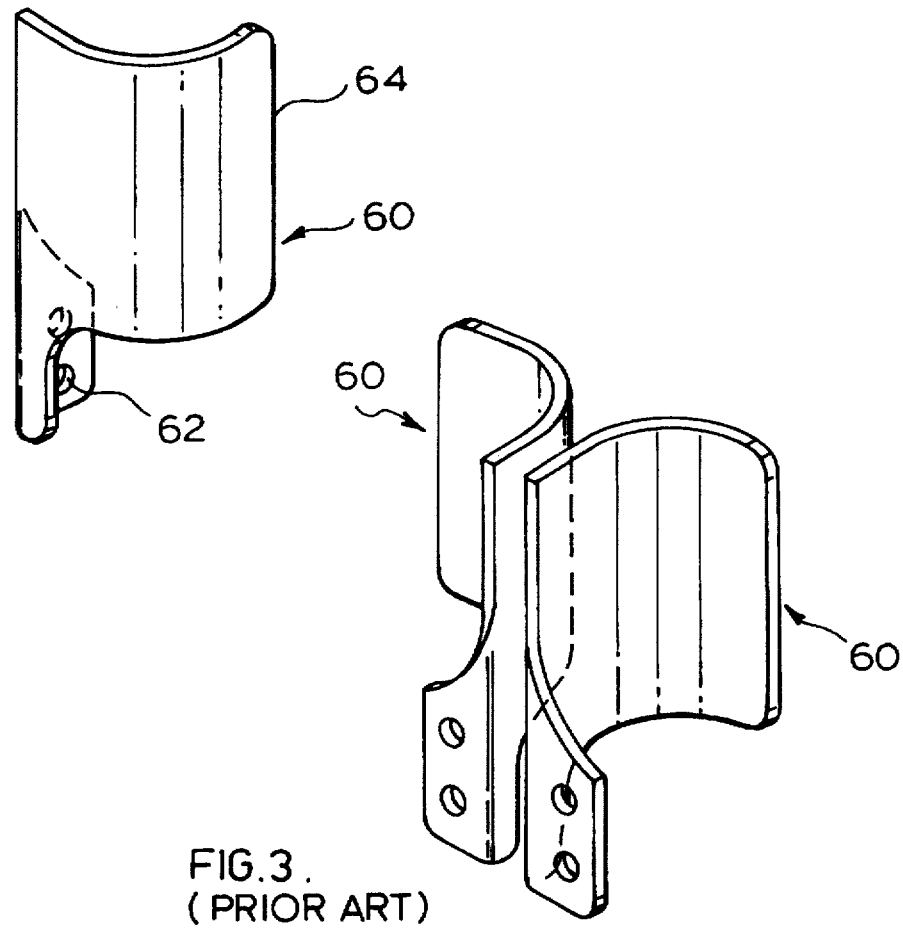
FIG. 3.
(PRIOR ART)
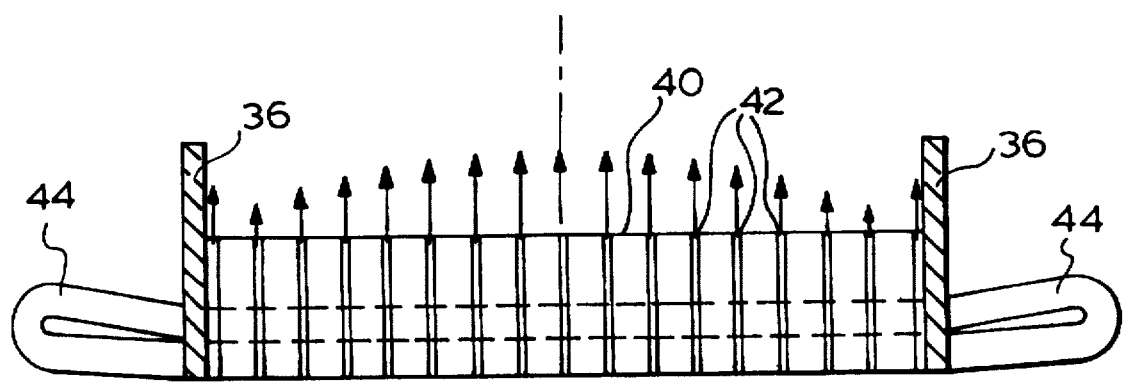
FIG. 4. (PRIOR ART)

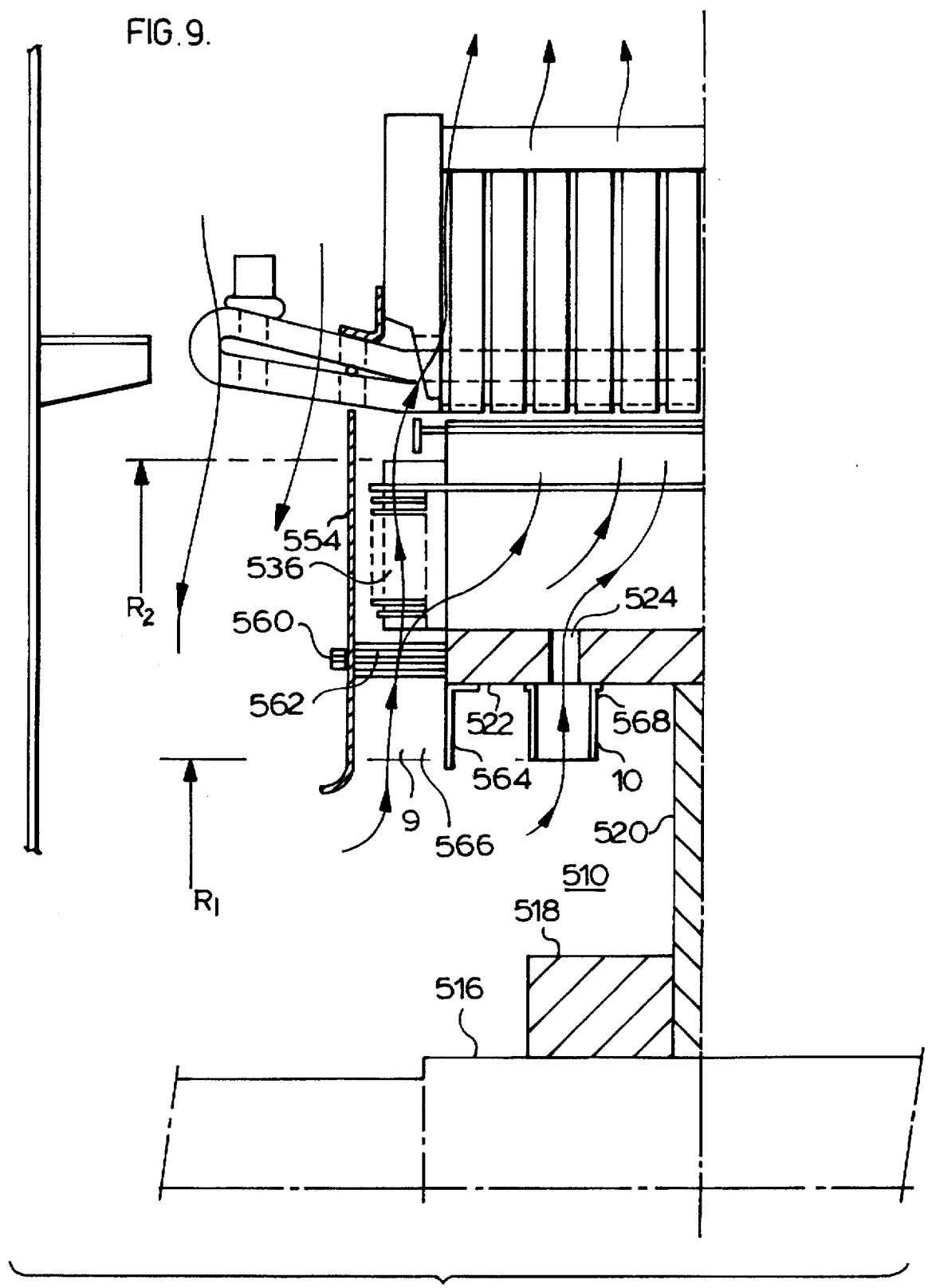

VENTILATION SYSTEM FOR AN AC MACHINE HAVING OVERHANGING SALIENT POLES WITH JUXTAPOSED SHROUDS

This invention is directed to an improved method of cooling of large low to medium speed self ventilating salient pole dynamoelectric machines (DEM's) by a modification to the rim of the rotor which, when used in conjunction with an air shroud which may be mounted on either the rotor or stator produces an improved cooling efficiency of the DEM.

The improvement is brought about by having the ends of the salient poles beyond the pole body protrude beyond the edge of the rotor rim. This induces ventilation air to flow radially outwardly past the edge of the rotor rim in spaces between the poles between the rim and the shroud. Because the rotor is rotating, the natural fanning action of the protruding pole ends pumps air outwardly, and because the shroud presents a barrier to air which would otherwise flow axially away from the air gap in the absence of the shroud, the air now is forced into the air gap and through other stator parts in the air flow path.

BACKGROUND OF THE INVENTION

Self ventilating low to medium speed AC salient pole DEM's have traditionally exhibited a large radial depth. A typical construction for such a DEM generally consists of a shaft on which a hub type frame is mounted, on which a barrel type rim is attached so that the hub supports the rim at some distance from the central shaft. Salient poles may then be bolted to the rim to complete the rotor construction.

The salient poles are usually bolted to the rim at both ends of the poles so that the ends of the poles are in line with the edge of the rim, in other words, the axial length of the poles (with the pole windings in place) is usually made to equal the axial width of the rim. The space between the adjacent poles is called the interpolar space.

In salient pole DEM's of the above type which are designed for parallel air flow, that is, where the ventilating air flows in two distinct paths in the machine, i.e. radially past the ends of the poles into the end heads of the windings and axially into the interpolar spaces and into the stator ventilating ducts, a shroud or shield is used in the DEM to provide a barrier adjacent the ends of the poles to cause the ventilation air to flow in the prescribed manner. The air that enters the stator ducts is merged with the air passing over the end heads of the stator windings in the stator frame at the back of the stator core.

In order to improve the air flow through such DEM's, designers have traditionally mounted scoop fans on the edge of the rotor rim immediately adjacent the interpolar spaces. For unidirectional salient pole DEM's, the scoop fan is located to one side of the interpolar space, so as to attempt to induce air to flow into the interpolar spaces during rotation of the rotor.

For bi-directional machines, a compromise must be made, and designers have traditionally mounted two scoop fans back to back on the rim of the rotor at a point midway between the adjacent poles. The effectiveness of this solution is open to question.

When the above types of cooling are analyzed, it will be found that while the scoop fans are primarily intended to move the air in an axial direction, the fans predominantly move the air in radial direction in a manner similar to a radial fan, with the result being that little air is moved in the intended axial direction (between the poles).

The air stream which results from the presence of the scoop fan in the presence of a surround barrier such as a shroud or shield tends to be such as to create a positive pressure on the concave side of the blade, with a negative pressure being generated on the convex side of the blade. This condition leads to the generation of turbulence, which results in increasing windage losses in the DEM.

The following patents will illustrate how the evolutionary process has included shrouds and fans in various ways to improve the air flow through salient pole machines.

U.S. Pat. No. 4,383,181 to Miznyama et al (May 10, 1983) shows a baffle system for a salient pole DEM wherein an annular baffle encircles each end of the rotor but is spaced a short distance from the pole and the rotor rim ends. The addition of the annular shield tends to captivate the air between the shield and the rotor so as to spin the entrapped air as the rotor turns and then release the entrapped air into the interpolar spaces. The invention claims a substantial reduction of windage loss.

Canadian Patent 1,019,397 (Oct. 18, 1977) to Sapper shows a salient pole DEM in FIGS. 3 and 4 which describes an annular shield to improve air flow through the machine. Alternately, a radial fan may be substituted in place of the annular shield if efficiency is not a design consideration or if it is desired to increase the nominal rating of the machine.

Both the above references recognize the basic problem of misdirected air flow at the ends of the rotor and stator of salient pole machines. Both references provide a solution by placing large annular shields adjacent the pole ends which must rotate with the rotor of the machine.

The rotating shield of the Mizuyama patent is displaced from the ends of the salient poles because the spider rim extends axially the entire length of the pole. This means that the pole ends are obscured with respect to radial air flow by the spider rim. There appears to be no radial blades on the rotating baffle and as such it is not clear how any significant static air pressure can be developed in the interpolar inlet region in the absence of radial impeller blades somewhere in the machine's construction.

The Sapper patent provides a separate centrifugal radial fan which in itself tends to block the flow of air at the inlet of the interpolar spaces, a condition that is open to suspect.

SUMMARY OF THE INVENTION

The present invention seeks to overcome the deficiencies of the prior art by providing a radial shroud having substantial radial length which may be fastened to either the rotor or stator of a salient pole DEM. In addition, the construction of the rotor of the DEM is modified so that the pole ends protrude beyond the edge of the rotor rim. This feature along with the deepened shroud provides the basic components of a crude air pump. The protruding pole ends function as thick radial blades of an impeller thus permitting a static air pressure head to be developed by the rotating pole ends in the presence of the shroud.

The resulting increase in air pressure across the interpolar spaces results in an improvement of the air flow through the interpolar spaces and the elimination of the scoop fan blades from the rotor which yields an increase in operating efficiency by the consequential reduction in windage losses.

BRIEF DESCRIPTION OF THE DRAWINGS

FIG. 2 shows a perspective view of a prior art scoop fan used in unidirectional rotating DEMs.

FIG. 3 shows a perspective view of a double scoop fan used on bi-directional rotating DEM's.

FIG. 4 is an illustration of the air flow distribution of the stator of a salient pole DEM in the absence of the rotor fans.

FIG. 9 is yet another alternative form of the invention as applied to the DEM of FIG. 6.

DESCRIPTION OF THE PREFERRED EMBODIMENT

Figure 1:
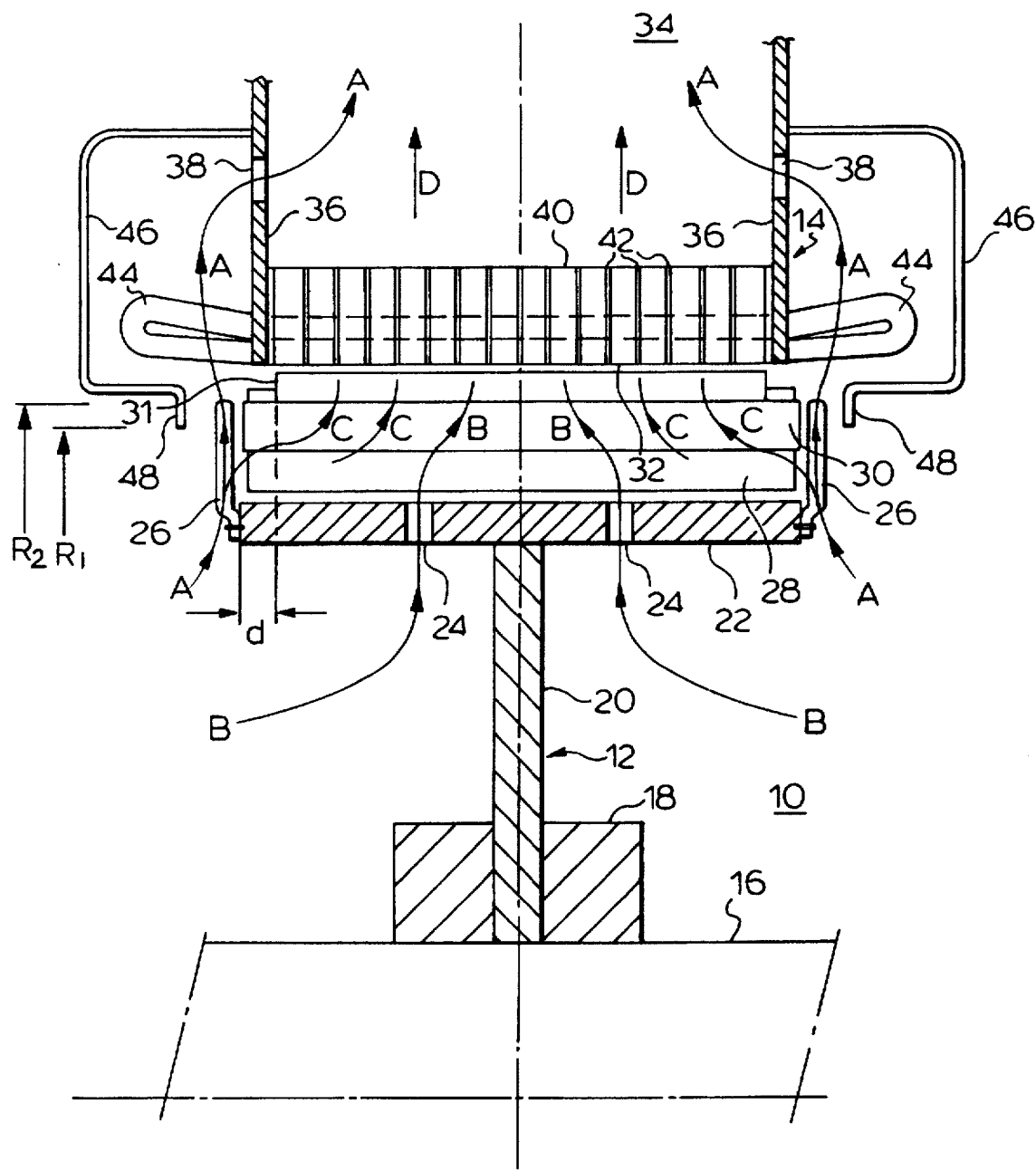
FIG. 1 is a diagram of a prior art medium to low speed salient pole machine showing the cooling air flow paths.

Referring to the drawings, and to FIG. 1 in particular, a prior art low to medium speed salient pole DEM 10 is shown. This DEM is illustrated to show how a prior art machine construction may be used to produce parallel air flow, that is, an air flow pattern wherein part of the air flow induced by the rotor passes past the end heads of the windings, and another part of the air flow passes into the interpolar spaces and passes through the air gap and into the stator ventilation ducts.

DEM 10 has a rotor 12 and a stator 14 in which rotor is suitably journalled in bearings (not shown) for rotation.

Rotor 12 comprises a shaft 16 on which a hub 18 is mounted. A web 20 completes the hub construction. A barrel rim 22 is suitably attached to hub web 20 by welding or some other suitable means of attachment.

Rim 22 is provided with apertures 24 placed at predetermined spaced locations on the rim 22. Scoop fans 26 are shown mounted on the edges of rim 22 to motivate air flow through the DEM 10 from the ends of the rim 22.

Poles 28 are shown mounted on rim 22 for carrying a winding 30 thereon.

An air gap 32 exists between poles 28 and stator 14. Stator 14 comprises a frame 34 of which members 36 are shown, each having ventilation apertures 38 shown therein.

A stator core 40 is mounted in frame 34 shown here mounted between frame members 36. The stator core 40 is composed of stacks of lamination punchings which are separated at spaced intervals by space blocks in ventilation slots 42.

A set of windings shown as 44 are mounted in slots of the lamination punchings of stator 40.

A pair of enclosures 46 are mounted on the stator frame members 36 to provide means to direct part of the ventilation air passing through the machine.

It must be remembered that FIG. 1 represents a partial sectional view of a salient pole DEM and members 46 for instance, are fairly large annular shaped members. Members 46 are shaped such that flanges 48 extend inwardly a small distance radially inwardly to ward the center of the DEM in juxtaposition with the ends of scoop blades 26.

The air flow pattern through the DEM is shown as entering the ends of the DEM 10 at A and B. Air entering from points A is drawn into the scoop fan areas and a large portion of the air which is moved by the scoop fans 26 passes past end heads 44 and through chambers enclosed by housings 46, through apertures 38 to the collection chamber formed by the frame members 36 of the back of the core of the DEM 10.

A portion C of the A stream is directed into the interpolar spaces where the rotor poles 30 and windings 30 are cooled and the C stream gradually bleeds across air gap 32, to pass through ventilation slots 42 of the stator 40 and form a portion of the exit air stream D.

The B air stream enters the interior of the rotor and is drawn through apertures 24 in the rotor because of the pumping action produced by the rotating poles 28. These apertures are located in the interpolar spaces so that the B stream is able to provide additional cooling for the rotor poles 28 and windings 30. As with air stream C, the B stream bleeds across the air gap 32 and passes through ventilation ducts 42 of stator 40 to become a component of exit air stream D. The exiting air streams A and D are ducted to atmosphere or to a heat exchanger.

Note that the prior art DEM of FIG. 1 utilizes a rotor construction wherein the rotor rim 22 has a width approximately equal to the length of poles 28 and windings 30. The width of the stator 40 and frame members 36 is almost the same dimension as the rim 22 and the poles 28 and windings 30.

The scoop fans 26 are mounted on the outside edge of the rim 22 and will be mounted to one side of the interpolar space, so that during rotation, the scoop fans 26 attempt to "scoop" air into the interpolar spaces.

The presence of flanges 48 provide confinement for the ends of blades 26 to allow a pressure build up of the air being moved by the blades 26.

The width of the flange 48 as indicated by $R_2 - R_1$ is the determining actor in the development of the static pressure build up for air passing through the scoop fans 26. The static pressure increase is proportional to the difference of the squares of the radii $R_2$ and $R_1$ and if this distance can be increased, the increase in static air pressure existing at $R_2$ would be substantial.

The machine illustrated in FIG. 1 is based on actual machine dimensions, and as such gives a fair representation of the dimensions and placement of the actual parts of a typical low speed salient pole DEM. Note the distance "d" which is the distance by which the rotor extends axially beyond the width of both the stator core laminations and the pole laminations 31.

FIG. 2 shows a perspective view of a scoop fan 60 used in prior art machines. The fan is provided with a base portion 62 which is integrally connected to air foil portion 64. This blade is bolted to the edge of rim 22 of the DEM 10 and will be offset from the center of the interpolar space in an attempt to scoop air into the interpolar spaces.

FIG. 3 shows the scoop fan arrangement for a bi-directional rotating machine. Here a pair of identical scoop fan blades 60 are mounted in a back-to-back relationship on the centerline of the interpolar space of the edge of the rim of the DEM.

FIG. 4 shows the stator airflow distribution for a DEM similar to the DEM illustrated in FIG. 1 with the scoop fans removed. Similar parts bear the same reference numerals. Note the uneven airflow across the width of the stator core 40.

Figure 5:
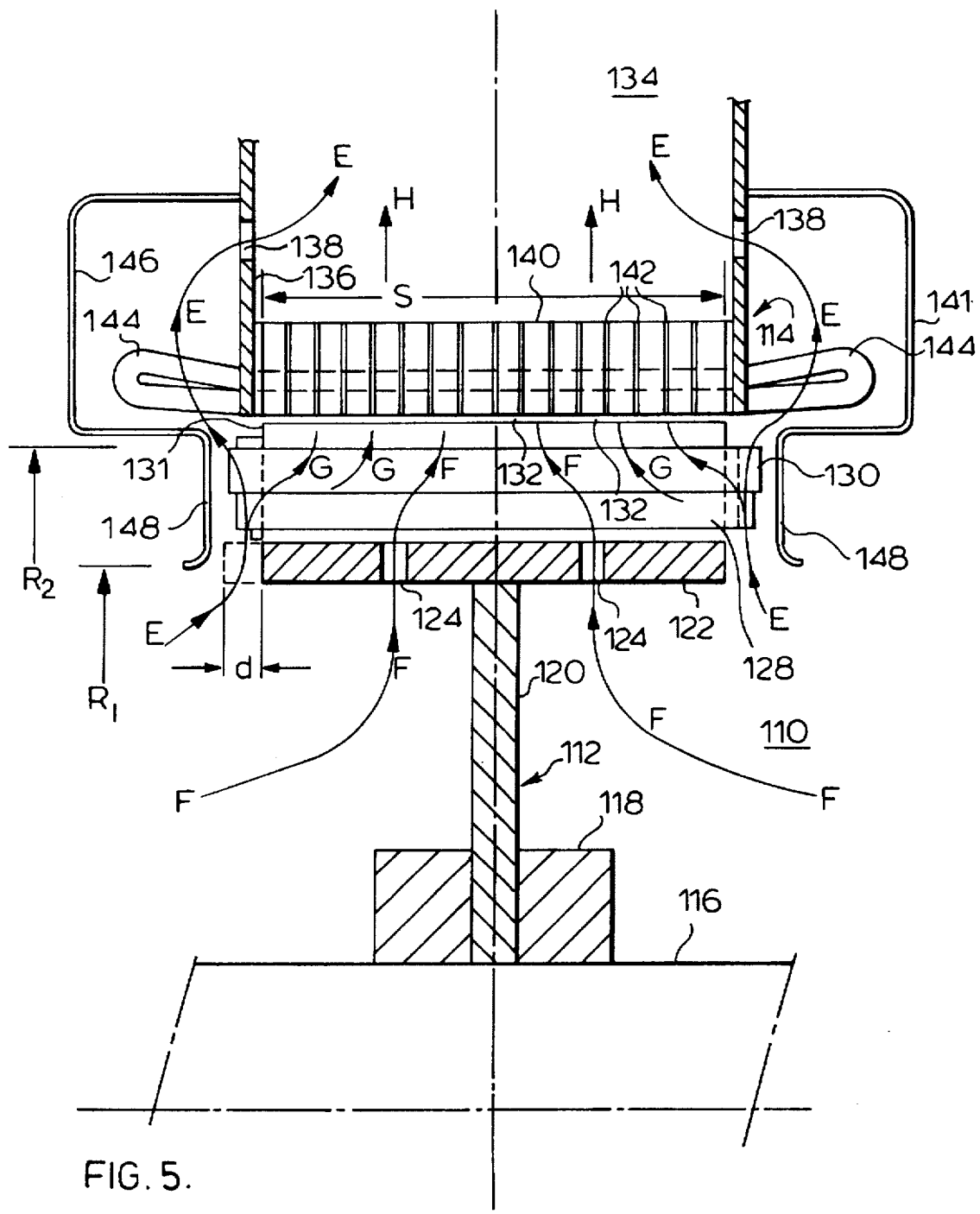
FIG. 5 is an illustration of a parallel air flow salient pole DEM to which this invention has been applied.

FIG. 5 shows a DEM 110 having the modifications of this invention. In this instance, the fans 26 are absent and the rotor 112 has been modified to reduce the width of the rotor rim 122 by a distance "2d". The length of the salient poles 128 and windings 130 are of the same dimensions as previously shown in the DEM of FIG. 1, but now protrude beyond the shortened rim 122. The enclosures 146 have a substantially different shape when compared to enclosures 46 in FIG. 1 in that the flange extensions 148 extend a much greater distance toward the center of the DEM 110 than did flanges 48 in FIG. 1. The distance $R_2 - R_1$ is much greater in FIG. 5 than FIG. 1.

The airflow pattern in FIG. 5 is produced by the rotating poles in combination with flanges 148 of enclosures 146. Because the rotor rim 122 is shortened, the protruding poles 128 and their windings 130 serve as thickened fan blades of a radial fan to propel air through the DEM 110.

Note that airstream E is roughly equivalent to the A stream of FIG. 1 and the F stream corresponds the B stream, etc. Because of the significant increase in the difference in the dimensions $R_2$ and $R_1$, the static pressure of the air gap will be increase and thus, the airflow will be substantially increased in DEM 110. Note that the width of the rotor 122 corresponds to the stator lamination stack length "S".

Figure 6:
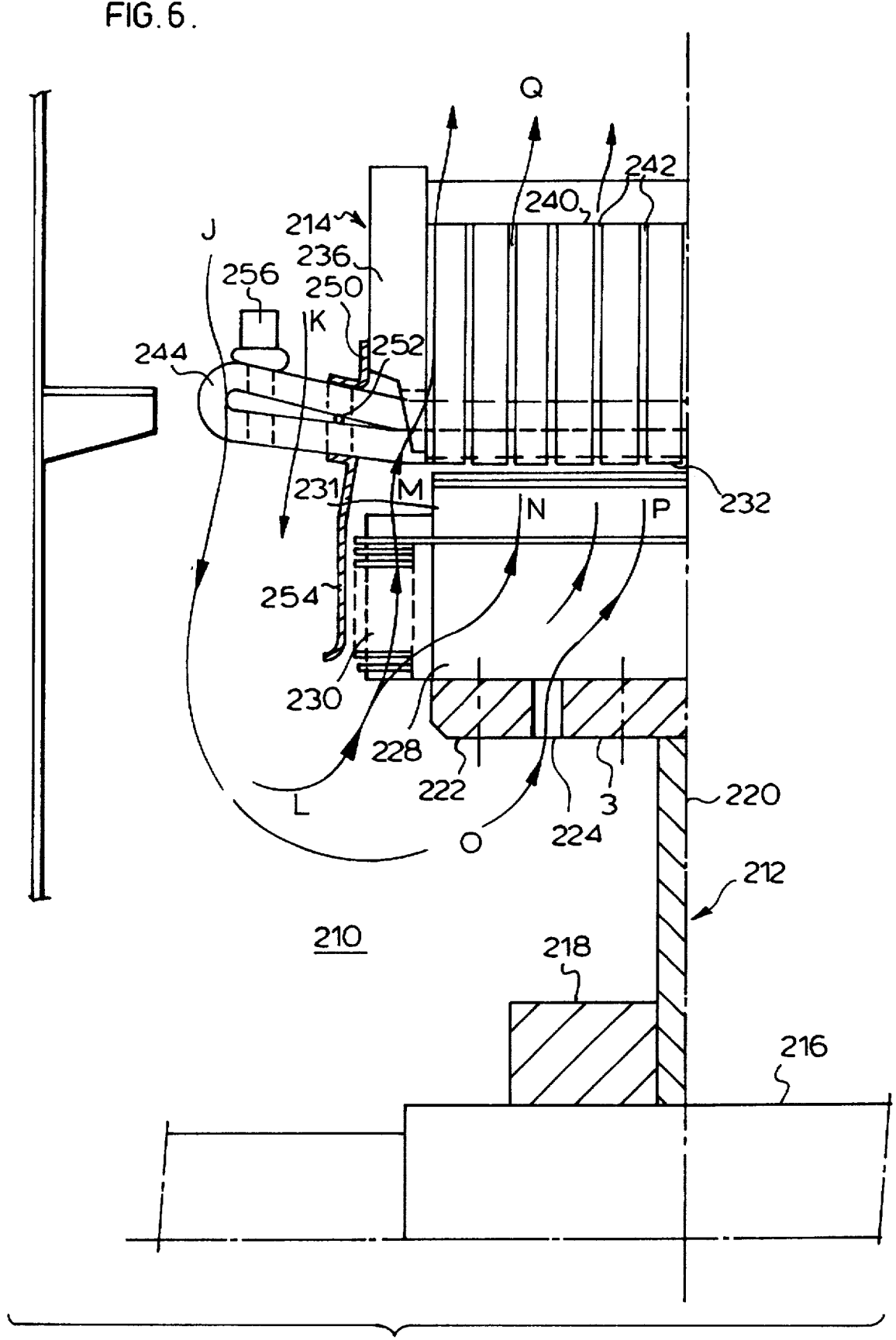
FIG. 6 is an illustration of a portion of a series air flow salient pole DEM to which this invention has been applied.

FIG. 6 shows a quarter section of a DEM 210 having a series air flow through the DEM 210. Here a rotor 212 rotates within a stator 214. The poles 228 and windings 230 again overlap rim 222. Instead of enclosures surrounding end heads 244 of stator windings, a seal ring 250 seals the outer circumference of end heads 244 to stator frame members 236. A second intermediary seal member 252 extends in the spaces between the endheads 244. Lastly, a stationary shroud 254 is attached to endheads 244. Member 254 extends nearly to the base of poles 228.

An additional winding brace 256 is shown so stabilize the ends of winding endheads 244. In FIG. 6, the airflow pattern is quite difference than previous figures. Here the inlet air enters at J and K and flows past end heads 244 (in a direction opposite to previous figures) to point L where the air stream makes substantially a 180° turn and is pulled into the rotor pole pump and into space M and into the interpolar spaces and thence into space N and into airgap 232.

From space M the air stream moves through the frame 236 and into ventilation slot adjacent frame member 236.

Another branch of the incoming J-K airstream enters the rotor space and passes through apertures 224 and into interpolar spaces at P and into air gap 232. Airstreams N and P pass through the air gap and enter ventilation ducts 242 and pass through the stator and joins the M air stream at Q where the air exhausts to atmosphere or to a heat exchanger.

This is a series flow situation and the air pressure developed by the pole ends is dependent on the depth of the annular shield 254, which in this instance extends almost the entire height of the pole 228.

Figure 7:
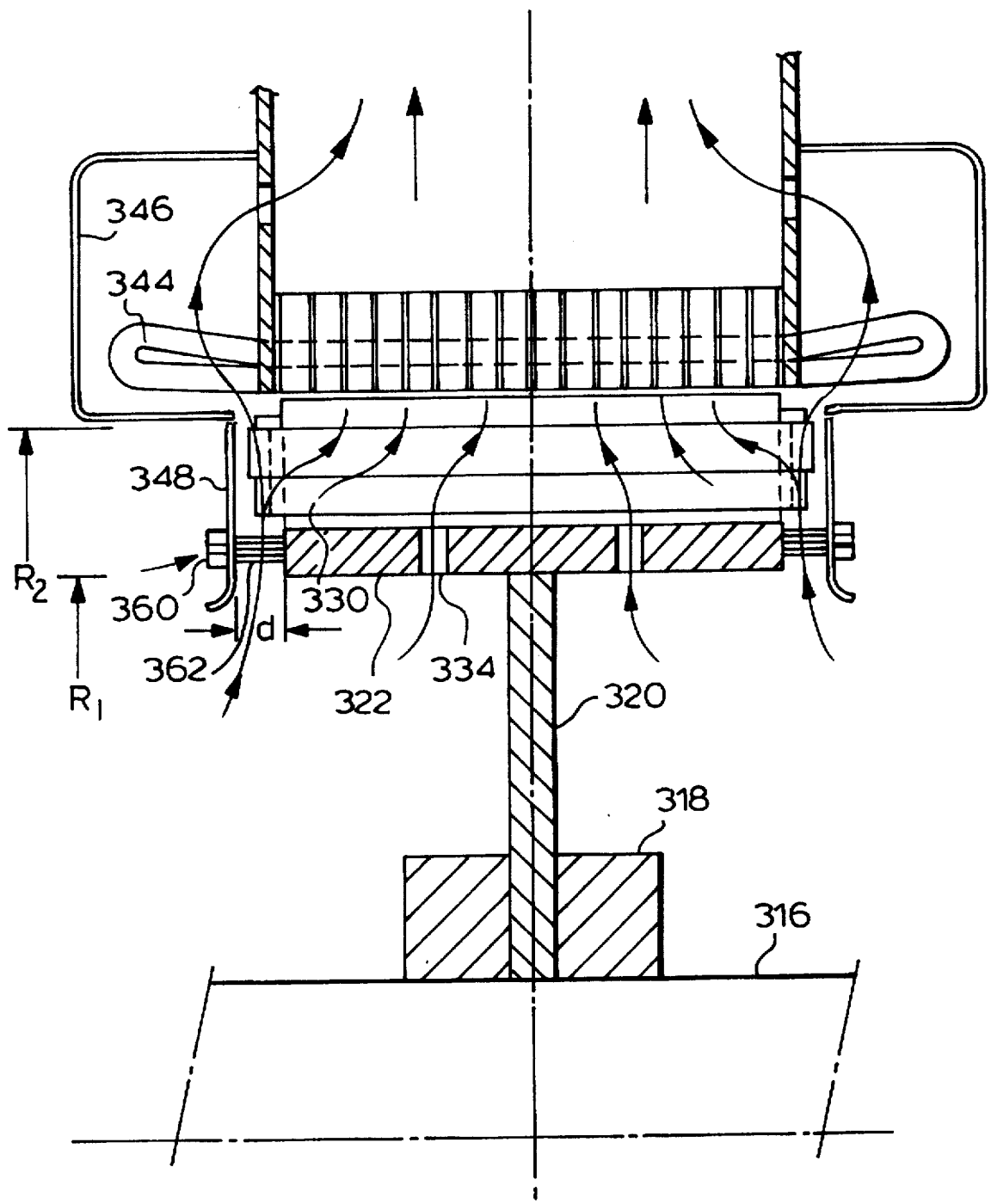
FIG. 7 is an alternate form of this invention as applied to the DEM of FIG. 5.

FIG. 7 illustrates a parallel air flow machine 310 which utilizes a rotating shroud 348 in combination with stationary enclosure 346 which produces an air flow pattern similar to that of DEM 110 in FIG. 5. The rotating shroud 348 is attached at the rim 322 by bolts 360 and spacers 362 which are located at equally spaced intervals around the rim 322.

The static pressure of the head developed as the air passes between shroud 348 and poles 330 is dependent upon the difference between the squares $R_2$ and $R_1$ as previously described.

Figure 8:
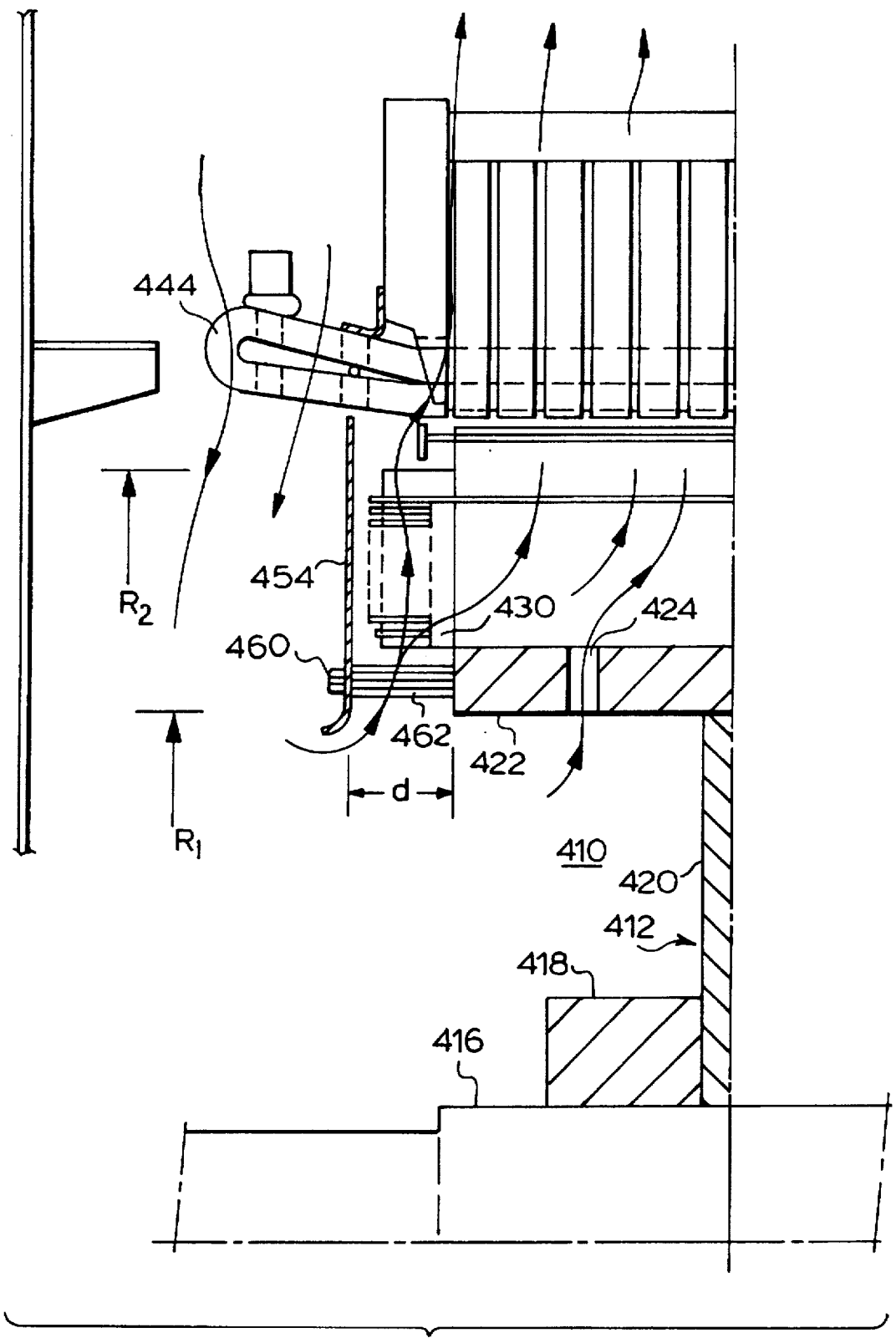
FIG. 8 is an alternate form of this invention as applied to the DEM of FIG. 6.

FIG. 8 illustrates a series flow DEM 410 which is similar to the DEM illustrated in FIG. 6 with the exception of the shroud 454 which is attached to rim 422 by means of bolts 460 and spacers 462. The static air stream pressure generated by the protruding poles 430 is proportional to the difference of the squares of the distances $R_2$ and $R_1$. It will be obvious that rotating shroud 454 must be sealed in some suitable manner to winding heads 444 to prevent excessive air leakage at this location.

FIG. 9 illustrates a series air flow DEM 510 which utilizes a pair of spaced air shields 554 and 564 to further increase the distance $R_2 - R_1$ to increase the static air pressure generated by the rotating poles 530. Radial blades 566 are attached between shields 554 and 564 at spaced intervals inwardly of the poles 530.

In addition, tubular extensions 568 are mounted on the inside of rotor rim 522 to increase the static air pressure at apertures 524 so as to improve the airflow in the interpolar spaces through rim 522.

It will be seen that the elimination of scoop fans is of paramount importance in improving the efficiency of low and medium speed salient pole DEM's. Because of the deficiencies in the overall performance of the scoop fans, this invention seeks to replace and augment the scoop fan function with a salient pole which protrudes beyond the edge of the rim of the rotor and rotates in juxtaposition with a rotary or stationary air shield. The primary objective of improving the differential distance $R_2 - R_1$ leads to a definite improvement in the static air pressure head built up in the vicinity of the rotating salient poles protruding beyond the edge of the rim at the air gap. The increased static pressure will result in increased air flow in both the interpolar spaces and stator ventilation ducts. Most motors of this type are limited by rotor field winding temperature, thus the increased air flow in the interpolar spaces is of primary importance to the successful operation of such machines.

In determining the reduction in rim width which is acceptable it will be found that the rim width may be made to equal the stator lamination stack width "S" as shown in the drawings without any degradation in the magnetic characteristics of the machine.

An additional benefit of the stationary shields results from the relatively small distance between the stationary shield and the end of the rotor winding of the rotating salient pole. The full tangential velocity of the pole end relative to the stationary shield results in an increase in the surface heat transfer co-efficient at the pole face ends. Rotating shrouds are generally more difficult to implement in comparison to stationary shrouds. Some shrouds may be composed of segments of a lightweight non-metallic material such as a suitable polymeric material reinforced with a glass fiber material. This material may be successfully used to fabricate either stationary or rotating shrouds.

I claim:

1. A salient pole DEM (dynamoelectric machine) comprising a stator assembly and a rotor assembly mounted within said stator assembly for rotation therein, said rotor assembly comprising a shaft integrally attached to a disc which carries a cylindraceous rim integrally attached thereto at the extremities of said disc, said rim having a set of salient poles mounted thereon,
said poles being of such length that the ends of each pole extend beyond the rim of said rotor assembly by a first predetermined distance, and, said stator assembly includes magnetic core having a set of stator windings whose ends protrude a second predetermined distance from said core, annular shroud means attached to the stator assembly of said DEM in such a manner as to enclose the ends of the windings projecting from said stator core in juxtaposition with said ends of said salient poles.

2. A DEM as claimed in claim 1 wherein said shroud is sealedly attached to the stator assembly of said DEM and extends radially inwardly to obscure a major portion of said poles.

3. A DEM as claimed in claim 1 wherein said shroud comprises two co-operating parts, a rotary part attached to said rotor assembly, said rotary part having the general shape of an annulus, said co-operating parts of said shroud obscuring a major portion of said poles.

4. A salient pole DEM comprising a stator and a rotor for rotating within said stator,
   said stator having a frame for supporting a core therein,
      said core comprising groups of punchings of a suitable magnetic material stacked in such a manner as to produce an annular core having ventilation spaces formed between said groups of punchings,
   said core having a plurality of windings extending through slots formed in said core,
   said windings extending beyond the ends of said core to form end heads for said windings,
   said frame also having ventilation ports provided therein in predetermined locations radially outwardly of said endheads,
   said rotor having a shaft mounted in suitable bearings for rotation in said stator, and rotor hub assembly mounted on said shaft for supporting a rim means thereon,
   said shaft and rim being interconnected by a rotor disc,
   said rim means having a plurality of salient poles mounted thereon at predetermined spaced intervals,
   each of said poles extending across said rim and slightly beyond the edge of said rim,
   shroud means mounted at the ends of the DEM in juxtaposition with the ends of the salient poles
   wherein said shroud means is sealedly attached to said stator of said DEM radially outwardly of said end heads and extending radially inwardly to obscure a major portion of said rotor poles.

5. A slow to medium speed salient pole DEM comprising a stator and a rotor,
   said stator comprising groups of laminations stacked together to form an annulus having an interior and exterior cylindraceous surface and having ventilation ducts formed in said stator at predetermined spaced intervals along the axis of said stator,
   said stator having a set of axial slots formed therein near the interior surface thereof for accepting stator windings therein,
   said windings extending beyond the ends of the annulus in the form of endheads for said windings,
   said stator being supported in a frame; enclosure means surrounding said frame and stator and extending along the ends of said stator so as to extend inwardly past the endheads of said stator windings into the rotor space,
   said rotor having a shaft mounted in suitable bearings for rotation within said stator,
   said rotor shaft having a disc mounted thereon for supporting a rotor rim thereon,
   said rim having a plurality of salient poles mounted thereon such that the ends of said salient poles overhang the edge of said rim by a predetermined distance,
   said enclosure extending radially inwardly toward said shaft in juxtaposition with said salient poles to form a shroud for said rotor,
   said enclosure obscuring at least a part of salient poles.

6. A salient pole DEM as claimed in claim 5 in which said frame has spaced ventilation apertures in said frame outwardly of said endheads to permit communication between the endhead enclosure and the enclosure surrounding said frame.

7. A salient pole DEM as claimed in claim 6 wherein said rotor rim is provided with suitable ventilation apertures between said salient poles for the passage of ventilating air therethrough.

8. A salient pole DEM as claimed in claim 6 wherein a second shroud in the form of an annulus is mounted on said rotor to co-operate with said endhead enclosure to form an interface,
   said rotor shroud forming a partial seal at the interface of the endhead enclosure and rotor shroud, said rotor shroud obscuring said salient pole.

9. A salient pole DEM as claimed in claim 6 wherein said rotor rim is provided with suitable ventilation apertures between said poles for the passage of ventilating air therethrough.

10. A salient pole DEM as claimed in claim 9 wherein said rotor rim has ventilation apertures formed therein at predetermined spaces between said poles.

11. A slow to medium speed salient pole DEM comprising a rotor and stator mounted in a suitable frame, enclosure means for said frame for ducting ventilation air therethrough,
   said stator comprising groups of magnetic laminations stacked together to form an annulus having an interior and exterior cylindraceous surfaces, and having suitable ventilation ducts formed in said stator at predetermined spaced intervals along the axis of said stator,
   said stator having a set of axial slots formed therein near the interior surface thereof for accepting stator windings therein,
   said windings extending beyond the ends of the annulus in the form of endheads for said windings,
   said endheads having sealing means applied thereto adjacent the ends of the annulus to form a ventilation barrier,
   said enclosure enclosing the frame and the exterior surface of said annulus to form a ventilation space for the collection of air passing from said ventilation ducts of said stator,
   said rotor having a shaft mounted in suitable bearings for rotation within said stator, said rotor shaft having a disc attached thereto for supporting a rotor rim thereon, said rotor rim serving as a suitable mounting means for a plurality of salient poles thereon, such that the ends of the salient poles overhang the edge of said rim by a predetermined distance,
   said rotor having an annular shroud mounted thereon adjacent the ends of said salient poles for rotation with said rotor, such that said rotor poles are obscured by said annular shroud, said shroud being aligned with said ventilation barrier of said stator to form a partial seal therewith.

12. A slow to medium speed salient pole DEM comprising a rotor and stator mounted in a suitable frame, enclosure means for said frame for ducting ventilation air therethrough,
   said stator comprising groups of magnetic laminations stacked together to form an annulus having an interior and exterior cylindraceous surfaces, and having suitable ventilation ducts formed in said stator at predetermined spaced intervals along the axis of said stator,
   said stator having a set of axial slots formed therein near the interior surface thereof for accepting stator windings therein, said windings extending beyond the ends of the annulus in the form of endheads for said windings, said endheads having sealing means applied thereto adjacent the ends of the annulus to form a ventilation barrier, said enclosure enclosing said frame and the exterior surface of said annulus to form a ventilation space for the collection of air passing from said ventilation ducts of said stator, said rotor having a shaft mounted in suitable bearings for rotation within said stator, said rotor having a disc attached thereto for supporting a rotor rim thereon, said rotor rim serving as a suitable mounting means for a plurality of salient poles thereon, such that the ends of the salient poles overhang the edge of said rim by a predetermined distance, annular shroud means attached and sealed to said stator at said ventilation barrier extending inwardly toward said shaft adjacent the ends of said salient poles of said rotor, said shroud obscuring at least a part of said poles.

13. A salient pole DEM as claimed in claim 12 wherein said rotor rim has ventilation apertures formed therein at predetermined spaces between said poles.

* * * * *